(12) United States Patent
Jader

(10) Patent No.: US 6,681,923 B2
(45) Date of Patent: Jan. 27, 2004

(54) MOUNTING AND REMOVING A CONTINUOUS CONVEYOR BELT

(75) Inventor: Lennardt Jader, Strande (DE)

(73) Assignee: NexPress Solutions LLC, Rochester, NY (US)

( * ) Notice: Subject to any disclaimer, the term of this patent is extended or adjusted under 35 U.S.C. 154(b) by 0 days.

(21) Appl. No.: 10/180,183

(22) Filed: Jun. 26, 2002

(65) Prior Publication Data

US 2003/0015407 A1 Jan. 23, 2003

(30) Foreign Application Priority Data

Jul. 23, 2001 (DE) .......................................... 101 35 772

(51) Int. Cl.$^7$ ............................................. B65G 23/44
(52) U.S. Cl. .................................... 198/861.1; 198/813
(58) Field of Search .............................. 198/493, 813, 198/860.1, 861.1, 861.2

(56) References Cited

U.S. PATENT DOCUMENTS

| | | | | |
|---|---|---|---|---|
| 4,846,338 A | * | 7/1989 | Widmer | 198/813 |
| 5,022,514 A | * | 6/1991 | Lofberg | 198/813 |
| 5,657,857 A | * | 8/1997 | Neilson et al. | 198/861.1 |
| 5,915,527 A | * | 6/1999 | Nakamura | 198/861.1 |
| 6,044,960 A | * | 4/2000 | Cloud et al. | 198/493 |
| 6,281,478 B2 | * | 8/2001 | Chandler et al. | 198/861.1 |

FOREIGN PATENT DOCUMENTS

| | | | | |
|---|---|---|---|---|
| CH | 683176 A5 | 1/1994 | ........... | B65G/15/00 |
| DD | 87 267 | 1/1972 | ........... | B65G/15/60 |
| DE | 829 573 | 1/1952 | | |
| EP | 1 013 570 A1 | 6/2000 | ........... | B65G/21/10 |
| FR | 2 663 309 | 12/1991 | ........... | B65G/21/10 |
| GB | 2 241 682 A | 9/1991 | ........... | B65G/21/00 |
| SU | 1049173 A | 10/1983 | ........... | B22D/11/06 |

* cited by examiner

*Primary Examiner*—James R. Bidwell
(74) *Attorney, Agent, or Firm*—Lawrence P. Kessler

(57) ABSTRACT

A method and conveying device for mounting and removing a conveyor belt or web, particularly for a printing press. A shell-shaped sub-carrier is attached to each front side of a frame of a printing press, and the conveyor belt or web is mounted or removed from this frame via the sub-carriers. The invention makes it possible for a single operator of a machine to simply and quickly change the conveyor belt or web.

3 Claims, 1 Drawing Sheet

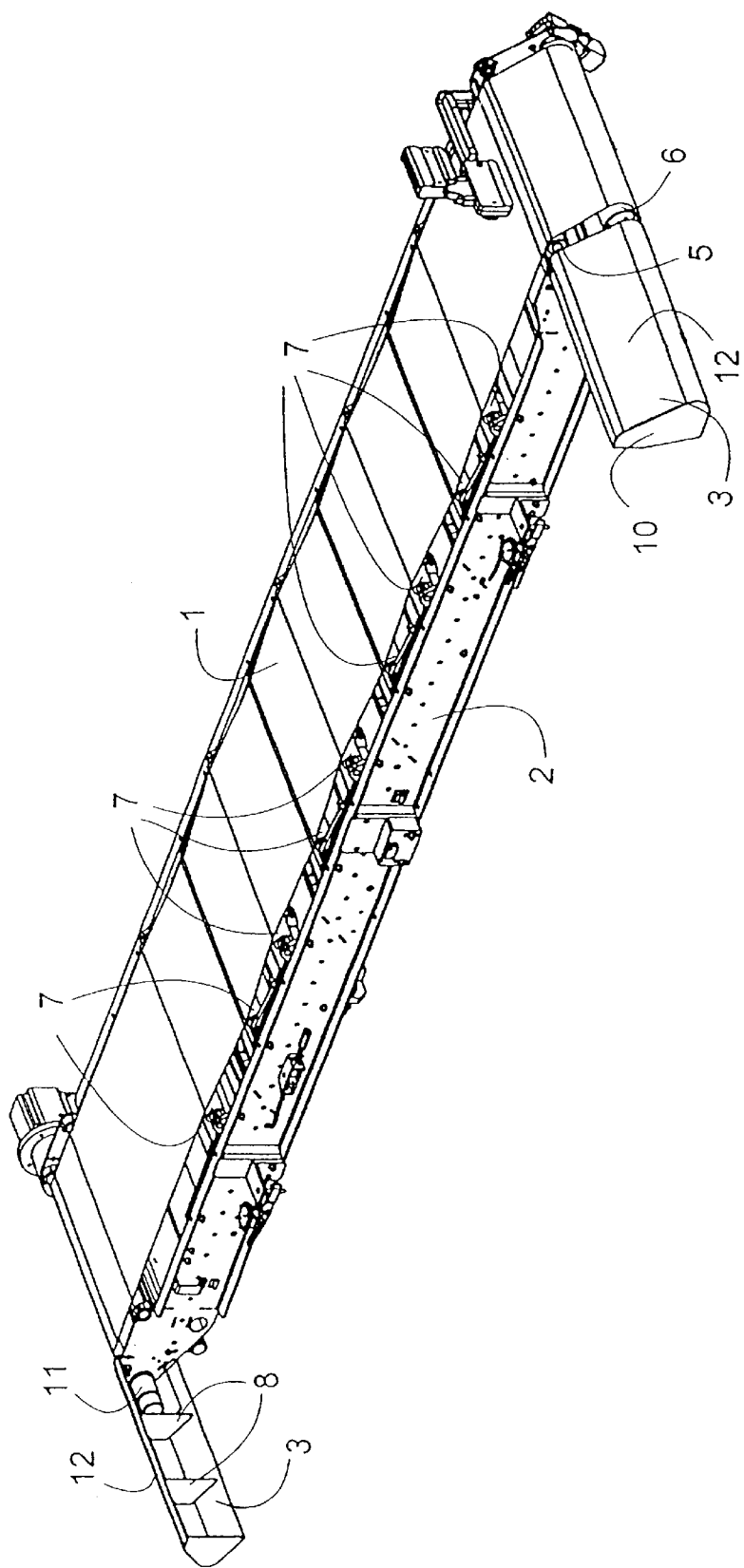

MOUNTING AND REMOVING A CONTINUOUS CONVEYOR BELT

FIELD OF THE INVENTION

The invention relates to a method and conveying device for mounting and removing a continuous conveyor belt for a printing press.

BACKGROUND OF THE INVENTION

Conveyor belts of printing presses (also known as webs), for conveying stock through the printing press, include a continuous belt, which is stretched around a frame and which is driven by high-speed rollers. With the operation of a printing press, a change of the web is required from time to time, whereby the mounted web is removed and another web is mounted in its place. The changing of the web is particularly impeded by the fact that the web is a continuous closed loop that cannot be separated. As such there are considerable possibilities that the web will come into damaging contact with various elements of the printing press located in proximity to the web and its path within the printing press.

To date, a maintenance technician trained on the specialized printing press had to be called to the premises of the printing press in order to have the web changed. The changing of the web, even for a dedicated maintenance technician, is difficult and takes a considerable amount of time. This creates high maintenance costs for the printing press and long, costly down times of the printing press.

SUMMARY OF THE INVENTION

In view of the above, this invention is directed to mounting and removing a continuous conveyor belt for a printing press. A sub-carrier is attached to each front side of a frame which is approximately the same width as the conveyor belt, and has surface shape that is somewhat similar to the track of the conveyor belt on the frame in the areas of the frame; and the continuous conveyor belt or is mounted or removed from the frame via the sub-carriers.

The purpose of the invention is to mount a continuous conveyor belt or web on a frame or to remove it from the frame in a cost-effective, quick and simple manner. The invention makes it possible for a single operator of a machine to simply and quickly change the continuous conveyor belt or web. In order to reduce the force required to change the web, the frame with the web is folded down prior to the change of the web.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawing, in which the single FIGURE shows a perspective view of a frame of a printing press including a conveying device, for mounting and removing a continuous conveyor belt, according to this invention.

DETAILED DESCRIPTION OF THE INVENTION

The invention is described with reference to the attached FIGURE, which shows a perspective view of a frame 2 of a printing press. The frame 2 contains a plurality of rollers 7, and first corner rollers 5 and second corner rollers 6 (as shown only on the front side of the frame 2). A continuous conveyor belt (or web) 1 is stretched around a frame 2, around the rollers 7, and around the first corner rollers 5 and the second corner rollers 6. The web 1 is a continuous belt, for example made of a transparent plastic material, and is driven at high speed by the rollers 7, or by at least one of the corner rollers 5, 6.

The web 1 is subject to high wear and tear and is required to be changed from time to time. Just pulling the mounted web 1 off of the frame 2 is arduous, at least for a single operator of the printing press, due to the dimensions of the arrangement according to the FIGURE. Furthermore, there is the danger that when the web 1 is put on or simply pulled off the frame 2, it may be damaged by the frame, or may damage the frame or elements of the printing press around the frame.

With respect to the invention, the operator of the printing press opens the housing of the printing press (not shown) in which the frame 2 is located according to the FIGURE, and then simply attaches self-locking sub-carriers 3 to each front side of the frame 2. The sub-carriers 3 have an external form that corresponds approximately to the track of the web 1 on the frame 2 in the end areas of the frame 2, as can be seen in the FIGURE, and are of a length substantially equal to the width of the web. In this connection, the term "external form" indicates the outerlying surfaces 12 of the attached sub-carriers 3 as viewed from the frame 2.

The ends of the frame 2 each have a first corner roller 5 and a second corner roller 6, which are offset at various heights and which are arranged so that they are offset from each other in the longitudinal direction to the frame 2. Consequently, the track of the web 1 in the end areas of the frame 2 shows a curvature, whereby the cross-section of the end areas of the frame 2 is approximately triangular when the missing triangular side is formed beginning with the vertical line at the first corner roller 5 and finishing with the web 1 on the under side of the frame 2.

The sub-carriers 3 have an external shell with an approximately triangular cross-section, which has been configured with respect to the end areas of the frame 2 accordingly. The sub-carriers 3 have thin walls that are manufactured, for example, from aluminum. They are hollow and, when viewed from frame 2 with the fixed position of the sub-carriers 3 according to the FIGURE, may have innerlying stabilizing components 8 in the form of somewhat thin ribs that extend vertically within the sub-carriers 3 and which are solidly connected with the sub-carriers. The outerlying surfaces 12 of the sub-carriers 3 have a very small friction coefficient, so that the force required for sliding the web 1 on or pulling the web off the frame 2 is very small. The outerlying surfaces 12 are, for example, polished for this purpose.

On one side, the sub-carrier 3 shows a sidewall 10, which closes the sub-carrier on such side and stabilizes the sub-carrier. But there is no wall on the opposite side of the sub-carrier 3. This serves to enable the sub-carrier to be attached to the frame 2. For simple and quick attachment, a pin 11 protrudes from the frame 2 substantially perpendicular to the frame, and is adapted to engage the sub-carrier 3 and establishes a connection therewith. The outerlying surfaces 12 form almost homogenous planes with the surfaces of the web 1 adjacent to the first corner rollers 5 and the second corner rollers 6, and after the attachment of the sub-carrier 3, the outerlying surfaces 12 almost seamlessly blend in with the surfaces of the web 1.

The operator can therefore simply pull the web 1 over the outlying surfaces 12 of the sub-carrier 3, whereby the web 1 with low frictional resistance slides over the outlying surfaces 12, and remove the web 1 without it being damaged by the frame 2. To this end, the operator needs only to pull on the web 1 a few times from one of the front sides of the frame 2 end area with sub-carrier 3 to the other front side of the frame end area with the other sub-carrier to pull the web 1 at the corresponding front side, piece by piece, via the corresponding sub-carriers. The mounting of the web 1 onto the frame 2 is carried out in a similar manner.

To change the web 1, after the opening of the housing (not shown) of the printing press on the opened long side, the frame 2 can preferably be folded downward. On the opposite frame side, a pivot is located around which the frame 2 is folded. The frame 2 is folded downward to a limit stop (not shown) by the operator, which considerably facilitates the removal or the attachment of the web 1. Following the changing of the web 1, i.e., the removal of the web 1 and the mounting of another web, the self-locking sub-carriers 3 are removed by simply lifting them off of the frame 2. The printing press is operational once the printing press housing is closed. The pulling off or lifting up of the frame 2 from the printing press to change the web 1, and the required state-of-the-art devices are economized in this manner.

The invention has been described in detail with particular reference to a certain preferred embodiment thereof, but it will be understood that variations and modifications can be effected within the spirit and scope of the invention.

What is claimed is:

1. Method for mounting and removing a continuous conveyor belt or web (1) on a frame (2), particularly in a printing press, characterized in that a sub-carrier (3) is attached to each end area of a front side of the frame (2) which is approximately the same width as the web (I), and has a surface shape that is somewhat similar to the track of the web (1) on the frame (2) in the end areas of the frame; and the continuous conveyor belt or web (I) is mounted or removed from the frame (2) via the sub-carriers (3).

2. Method according to claim 1, characterized in that the sub-carriers (3) are attached in an axial direction to corner rollers (5, 6) of the frame.

3. Conveying device for a continuous conveyor belt or web (1) with a frame (2), preferably for a printing press, characterized by attachable sub-carriers (3) on each end area of a front side of the frame (2) for mounting and removing a continuous conveyor belt or web (1), said sub-carriers being approximately the same width as the web (1), and having respective surface shapes that are substantially similar to the track of the web (1) on the frame (2) in the end areas of the frame.

* * * * *